(12) United States Patent
Narasimhamurthy (10) Patent No.: US 9,680,797 B2
(45) Date of Patent: Jun. 13, 2017

(54) DEEP PACKET INSPECTION (DPI) OF NETWORK PACKETS FOR KEYWORDS OF A VOCABULARY

(71) Applicant: Oracle International Corporation, Redwood Shores, CA (US)

(72) Inventor: Giridhar Narasimhamurthy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 438 days.

(21) Appl. No.: 14/288,414

(22) Filed: May 28, 2014

(65) Prior Publication Data
US 2015/0350039 A1    Dec. 3, 2015

(51) Int. Cl.
*G06F 15/173* (2006.01)
*H04L 29/06* (2006.01)
*H04L 12/24* (2006.01)

(52) U.S. Cl.
CPC ...... *H04L 63/0245* (2013.01); *H04L 41/0803* (2013.01)

(58) Field of Classification Search
CPC . H04L 63/0245; H04L 41/0803; H04L 64/06; H04L 64/1416
See application file for complete search history.

(56) References Cited

U.S. PATENT DOCUMENTS

| | | | | |
|---|---|---|---|---|
| 7,823,204 B2 * | 10/2010 | Gupta | ..................... | G06F 21/55 705/51 |
| 8,812,480 B1 * | 8/2014 | Watson | ............. | G06F 17/30657 707/710 |

(Continued)

FOREIGN PATENT DOCUMENTS

| | | |
|---|---|---|
| CN | 101478447 B | 1/2011 |
| WO | 2006113722 A2 | 10/2006 |

(Continued)

OTHER PUBLICATIONS

Sailesh Kumar, Sarang Dharmapurikar, Fang Yu, Patrick Crowley and Jonathan Turner, Algorithms to accelerate multiple regular expressions matching for deep packet inspection, Proceedings of the 2006 conference on Applications, technologies, architectures, and protocols for computer communications, date Oct. 2006, pp. 339-350, vol. 36 Issue 4, ISBN:1-59593-308-5.

(Continued)

*Primary Examiner* — Jonathan Bui
(74) *Attorney, Agent, or Firm* — IPHorizons PLLC; Narendra Reddy Thappeta (57) ABSTRACT

An aspect of the present disclosure provides deep packet inspection (DPI) of network packets for keywords of a vocabulary. In one embodiment, a mapping specifying association of respective keywords to corresponding unique pattern codes is maintained, with each pattern code being shorter in length compared to the corresponding keyword and being computed based on a formula. Upon receiving a network packet, a token (containing a sequence of characters) present in the network packet is first identified and the formula then applied to the identified token to generate a token code. The token is determined to match a specific keyword when the token code equals the pattern code corresponding to the specific keyword in the mapping.

20 Claims, 7 Drawing Sheets

(56) References Cited

U.S. PATENT DOCUMENTS

| | | | |
|---|---|---|---|
| 8,843,627 B1* | 9/2014 | Baldi | H04L 43/026 709/224 |
| 9,100,326 B1* | 8/2015 | Iliofotou | G06F 17/30861 |
| 2004/0174820 A1* | 9/2004 | Ricciulli | H04L 47/2441 370/245 |
| 2005/0102509 A1* | 5/2005 | Fascenda | G06Q 20/02 713/165 |
| 2005/0108554 A1* | 5/2005 | Rubin | G06F 8/427 713/187 |
| 2007/0011734 A1* | 1/2007 | Balakrishnan | H04L 43/026 726/13 |
| 2007/0118358 A1* | 5/2007 | Tom | G06F 8/425 704/10 |
| 2007/0130077 A1* | 6/2007 | Jagadeesan | G06F 21/55 705/59 |
| 2007/0226775 A1* | 9/2007 | Andreasen | H04L 63/0227 726/1 |
| 2008/0189784 A1 | 8/2008 | Mangione-Smith et al. | |
| 2009/0006645 A1* | 1/2009 | Cui | H04L 43/50 709/236 |
| 2009/0070459 A1* | 3/2009 | Cho | H04L 63/145 709/224 |
| 2010/0150104 A1 | 6/2010 | Yoon et al. | |
| 2011/0013527 A1* | 1/2011 | Varadarajan | H04L 41/14 370/252 |
| 2011/0214157 A1* | 9/2011 | Korsunsky | G06F 21/55 726/1 |
| 2011/0238855 A1* | 9/2011 | Korsunsky | G06F 21/55 709/231 |
| 2012/0233222 A1* | 9/2012 | Roesch | H04L 63/1408 707/812 |
| 2012/0331007 A1* | 12/2012 | Billa | G06F 17/30958 707/797 |
| 2012/0331554 A1* | 12/2012 | Goyal | H04L 69/22 726/23 |
| 2013/0212710 A1* | 8/2013 | Puttaswamy Naga | H04L 63/0245 726/30 |
| 2013/0269033 A1 | 10/2013 | Amaya Calvo et al. | |
| 2013/0311495 A1* | 11/2013 | Rossi | G06F 9/444 707/758 |
| 2014/0026194 A1* | 1/2014 | Smith | G06F 21/6245 726/4 |
| 2014/0222852 A1* | 8/2014 | Yitshak | G06F 17/30985 707/758 |
| 2015/0095648 A1* | 4/2015 | Nix | H04W 52/0235 713/170 |

FOREIGN PATENT DOCUMENTS

| | | |
|---|---|---|
| WO | 2007005704 A1 | 1/2007 |
| WO | 2013032473 A1 | 3/2013 |

OTHER PUBLICATIONS

Christopher L. Hayes, Yan Luo, DPICO: a high speed deep packet inspection engine using compact finite automata, Proceedings of the 3rd ACM/IEEE Symposium on Architecture for networking and communications systems, date 2007, pp. 195-203, ISBN: 978-1-59593-945-6.

Fang Yu, Zhifeng Chen, Yanlei Diao, Lakshman, T.V. , Katz, R.H, Fast and memory-efficient regular expression matching for deep packet inspection, Architecture for Networking and Communications systems, 2006. ANCS 2006. ACM/IEEE Symposium, Date of Conference: Dec. 3-5, 2006, pp. 93-102, Print ISBN: 978-1-59593-580-9.

R. Fielding, J. Gettys, J. Mogul, H. Frystyk, L. Masinter, and T. Berners-Lee, Hypertext Transfer Protocol—HTTP/1.1, Network Working Group, Request for Comments: 2616, Obsoletes: 2068, Category: Standards Track, date Jun. 1999, pp. 1-157.

* cited by examiner

411 → Host finance.acme.com => Forward 192.168.1.102

412 → Host doc*.acme.com => Forward 192.168.1.103

413 → DELETE * => Redirect 192.168.1.111

414 → Accept-Language en-us, en => Validate

415 → Content-Type => Required

*FIG. 4A*

| Keyword | Pattern Code | Length |
|---|---|---|
| DELETE | 48B324EC | 6 |
| Host | 0E9CF7C8 (L) | 4 |
| Accept-Language | AC7064B5 (H) | 15 |
| Content-Type | 33044733 | 12 |

441 / 442 / 443

450, 461→DELETE, 462→Host, 463→Accept-Language, 464→Content-Type

*FIG. 4C*

| 421 Char (c) | 422 Ascii (a) | 423 position (n) | 424 overflow (v) | 425 weight (w = 2^(7*n-32*v)) | 426 sub-total (t = a*w) |
|---|---|---|---|---|---|
| A | 65 | 0 | 0 | 2^0 = 1 | 65 |
| c | 99 | 1 | 0 | 2^7 = 128 | 12672 |
| c | 99 | 2 | 0 | 2^14 = 16384 | 1622016 |
| e | 101 | 3 | 0 | 2^21 = 2097152 | 211812352 |
| p | 112 | 4 | 0 | 2^28 = 268435456 | 30064771072 |
| t  ← 431 | 116 | 5 | 1 | 2^3 = 8 | 928 |
| - | 45 | 6 | 1 | 2^10 = 1024 | 46080 |
| L | 76 | 7 | 1 | 2^17 = 131072 | 9961472 |
| a | 97 | 8 | 1 | 2^24 = 16777216 | 1627389952 |
| n | 110 | 9 | 1 | 2^31 = 2147483648 | 236223201280 |
| g  ← 432 | 103 | 10 | 2 | 2^6 = 64 | 6592 |
| u | 117 | 11 | 2 | 2^13 = 8192 | 958464 |
| a | 97 | 12 | 2 | 2^20 = 1048576 | 101711872 |
| g | 103 | 13 | 2 | 2^27 = 134217728 | 13824425984 |
| e  ← 433 | 101 | 14 | 3 | 2^2 = 4 | 404 |

Pattern code (Accept-Language) = 282065921205
= 41AC7064B5 (Hexadecimal) = AC7064B5 (Hexadecimal) ← 435

*FIG. 4B*

```
GET /tutorials/other/top-20-mysql-best-practices/ HTTP/1.1\r\n  ←472
Host: documents.acme.com\r\n  ←475
User-Agent: Mozilla/5.0 (Windows; U; Windows NT 6.1; en-US; rv:1.9.1.5) Gecko/20091102 Firefox/3.5.5 (.NET CLR 3.5)\r\n
Accept: text/html,application/xhtml+xml,application/xml;q=0.9,*/*;q=0.8\r\n
Accept-Language: en-us,en;q=0.5\r\n  ←478
Accept-Encoding: gzip,deflate\r\n
Accept-Charset: ISO-8859-1,utf-8;q=0.7,*;q=0.7\r\n
Keep-Alive: 300\r\n
Connection: keep-alive\r\n
Cookie: PHPSESSID=r2t5uvjq435r4q7ib3vtdjq120\r\n
Pragma: no-cache\r\n
Cache-Control: no-cache\r\n
\r\n  ←475
```

| | 481 Token | 482 Length | 483 Token code | (Hexadecimal) | 484 Compare? |
|---|---|---|---|---|---|
| 491→ | H | 1 | 72 | (00000048) | No |
| 492→ | Ho | 2 | 14280 | (000037C8) | No |
| 493→ | Hos | 3 | 1898440 | (001CF7C8) | No |
| 494→ | Host | 4 | 245168072 | (0E9CF7C8) | Yes |

DEEP PACKET INSPECTION (DPI) OF NETWORK PACKETS FOR KEYWORDS OF A VOCABULARY

BACKGROUND OF THE DISCLOSURE

Technical Field

The present disclosure relates to server/network systems, and more specifically to deep packet inspection (dpi) of network packets for keywords of a vocabulary.

Related Art

Network packets form the basis for communication between various systems connected by networks. For example, a source system may send a packet in accordance with Internet Protocol (IP) to a destination system on a network supporting IP connectivity.

Network packets are often inspected in various stages of the processing of the network packets. For example, an IP router may examine the header of an IP packet to determine the specific direction/interface on which to forward the packet. As is well known in the relevant arts, the fields in IP header are located in pre-specified bit positions, and thus the inspection may entail examination of bits at such pre-specified positions.

Deeper portions of network packets are often encoded using keywords and potentially associated data values. For example, the content beyond the TCP (Transmission Control Protocol)/IP headers is viewed as a deeper portion, and may accordingly be specified based on keywords. Each keyword has a pre-specified meaning/purpose defined by a vocabulary, and is in the form of a string of characters. HTTP (Hypertext Transfer Protocol) provides an example vocabulary for serving of web pages on networks.

Deep packet inspection (DPI) refers to examination of such deeper portions of the packets. As the bit positions of the various keywords and/or data values are not pre-specified (beyond a general definition of a range of bit positions the keywords/values can potentially exist), DPI presents challenges particularly when the processing is required to be performed with limited resources (time, memory, etc.).

Aspects of the present disclosure address some of such challenges/requirements to DPI of network packets for keywords of a vocabulary, as described below with examples.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides deep packet inspection (DPI) of network packets for keywords of a vocabulary. In one embodiment, a mapping specifying association of respective keywords to corresponding unique pattern codes is maintained, with each pattern code being shorter in length compared to the corresponding keyword and being computed based on a formula. Upon receiving a network packet, a token (containing a sequence of characters) present in the network packet is first identified and the formula then applied to the identified token to generate a token code. The token is determined to match a specific keyword when the token code equals the pattern code corresponding to the specific keyword in the mapping.

Thus, by performing potentially fewer comparisons (for example, in terms of the number of bits), deep packet inspection (DPI) of network packets for keywords may be enabled to be implemented in environments with limited resources.

According to another aspect of the present disclosure, the formula used for computing the pattern codes and also generating the token code is a positional formula which computes a number based on the value of each character in a sequence of characters and a corresponding weight assigned to the position of the character in the sequence of characters. Accordingly, the pattern code of each keyword is computed by applying the positional formula to the sequence of characters constituting the keyword and the token code of each token is computed by applying the positional formula to the sequence of characters constituting the token.

According to one more aspect of the present disclosure, in response to receiving a network packet, successive tokens are formed, with each successive token containing an additional character compared to a prior token. For each of the successive tokens, checking is then performed on whether or not the successive token equals one of the keywords maintained in the mapping.

According to yet another aspect of the present disclosure, a lowest value and a highest value among the unique pattern codes is maintained. The checking for each successive token is performed by first calculating a corresponding token code for the successive token. In the scenario that the corresponding token code is between the lowest value and the highest value, the corresponding token code is compared with at least some of the unique pattern codes of the mapping (noted above). Otherwise, the corresponding token code is excluded from the comparison.

According to an aspect of the present disclosure, a list of lengths of the keywords in the mapping is maintained. The checking for each successive token is performed by first identifying whether the length of the successive token is contained in the list of lengths. The comparison of the token code to some of the unique pattern codes in the mapping is performed only when the length of the successive token is identified as being contained in the list of lengths.

It may be appreciated that the checks of whether the token code is between the lowest and highest value and whether the length of the token is contained in the list of lengths ensures that only the token codes corresponding to potential matching keywords are compared with the pattern codes contained in the mapping.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
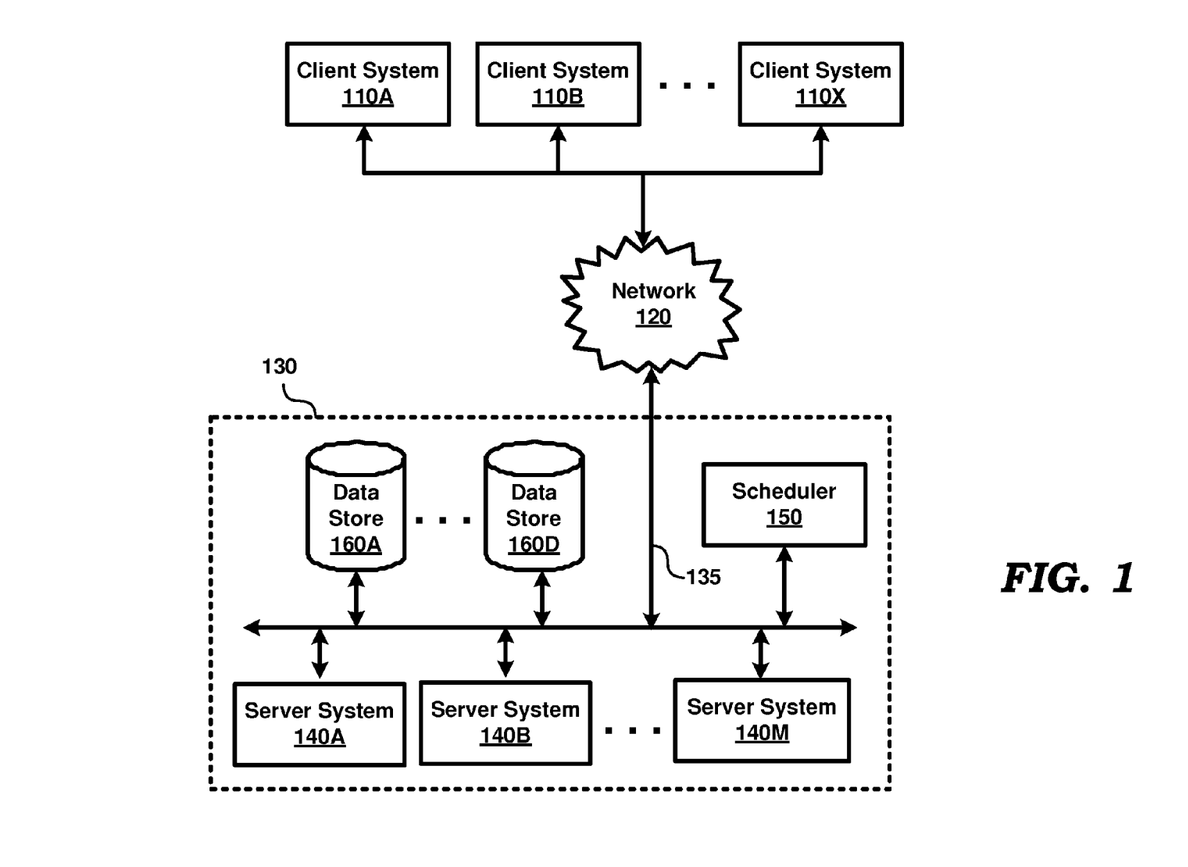
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing client systems 110A-110X, network 120 and cluster 130 (indicated by the dotted boundary). Cluster 130 is shown containing server systems 140A-140M, data stores 160A-160D, and scheduler 150.

Merely for illustration, only representative number/type of systems is shown in the Figure. Many environments may contain many more clusters and/or systems, both in number and type, depending on the purpose for which the environment is designed. Each system of FIG. 1 is described below in further detail.

Each of client systems 110A-110X represents a system such as a personal computer, workstation, mobile station, mobile phones, computing tablets, etc., used by users to generate (client) requests to enterprise applications executing in cluster 130. The requests (for using specific services provided by the applications) may be generated using appropriate user interfaces. In general, a client system requests an application/software for performing desired tasks/services and receives corresponding responses containing the results of performance/processing of the requested tasks/services.

Network 120 provides connectivity between client systems 110A-110X and cluster 130 (in particular, the systems of cluster 130). Network 120 may be implemented using protocols such as Transmission Control Protocol (TCP) and/or Internet Protocol (IP) well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet (or hereafter a "network packet") is said to be directed to a destination system when the destination IP address of the packet is set to the (IP) address of the destination system, such that the packet is eventually delivered to the destination system by network 120. When the packet contains content such as port numbers, which specifies the destination application, the packet may be said to be directed to such application as well. The destination system may be required to keep the corresponding port numbers available/open, and process the packets with the corresponding destination ports. Network 120 may be implemented using any combination of wire-based or wireless mediums.

Cluster 130 represents a group of servers/systems (i.e., "nodes") such as server systems, data stores, schedulers, etc., that work together to provide view of a single server/system from the perspective of processing of requests from various client systems. In other words, users using client systems 110A-110X view cluster 130 as a single system offering specific services (without being concerned regarding the individual nodes in the cluster). Clusters may include heterogeneous (i.e., having different hardware/software configuration) collections of nodes, that may be distributed geographically across multiple locations, and may sometimes be administered by one or more business organizations.

Some of the typical (types of) nodes in a cluster, such as data stores, server systems, and scheduler as relevant to the understanding of the present invention are described in detail below. However, a cluster may contain more types and/or number (typically, in thousands) of nodes as will be apparent to one skilled in the relevant arts.

Each of data stores 160A-160D represents a non-volatile storage facilitating storage and retrieval of a collection of data by one or more enterprise applications executing in the other nodes of cluster 130, in particular in server systems 140A-140M. Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Each of server systems 140A-140M represents a server, such as a web/application server, capable of executing (same/different) enterprise applications based on business requirements, the hardware configuration of the system, etc. Each enterprise application is capable of performing tasks/services requested by users using one of client systems 110A-110X. A server system may use data stored internally (for example, in a hard disk), external data maintained in data stores 160A-160D or that received from external sources (e.g., from the user) in performing such tasks. The server system then sends the result of performance of the tasks to the requesting client system (one of 110A-110X).

HTTP is a commonly used protocol to access the services provided by the various enterprise applications executing in cluster 130, with client systems 110A-110X accessing the desired services (and tasks) by sending HTTP client requests to specific URLs (Universal Resource Locators) associated with the services/tasks. In general, HTTP provides a vocabulary of keywords that enables a client system to indicate a type of the desired service sought to be accessed, the specific server system/application instance providing the desired service, the details of the desired services, etc. The keywords of the HTTP vocabulary are defined in detail in RFC 2616 entitled "Hypertext Transfer Protocol—HTTP/1.1".

Scheduler 150 allocates each incoming request to one of the server systems capable of processing the corresponding request. In case multiple server systems are capable of processing a specific type of request, the allocation may be performed while meeting secondary objectives such as load balancing among such servers. Accordingly, scheduler 150 may maintain information indicating which of the nodes (and/or the applications) are currently available/ready for processing packets/client requests, the number of packets/requests currently being processed by each node, etc.

Thus, scheduler 150 is designed as a point of access (in the cluster) for receiving network packets (forming the client requests) from client systems 110A-110X, and then perform various processing operations (such as forwarding of the packet to specific server system/application, re-routing of the packets to other schedulers, etc.) on the network packets.

In one embodiment, scheduler 150 is enabled to perform deep packet inspection (DPI) of the network packets to identify various keywords (for example, of HTTP) specified in the network packet, and then perform corresponding processing operations based on the identified keywords. For example, scheduler 150 may determine the specific server system/application to which a network packet is to be forwarded based on the matching keywords identified in the network packets.

Scheduler 150, provided according to several aspects of the present disclosure, facilitates the performance of DPI of network packets for keywords of a vocabulary (e.g., HTTP) as described below with examples.

3. DPI of Network Packets for Keywords

Figure 2:
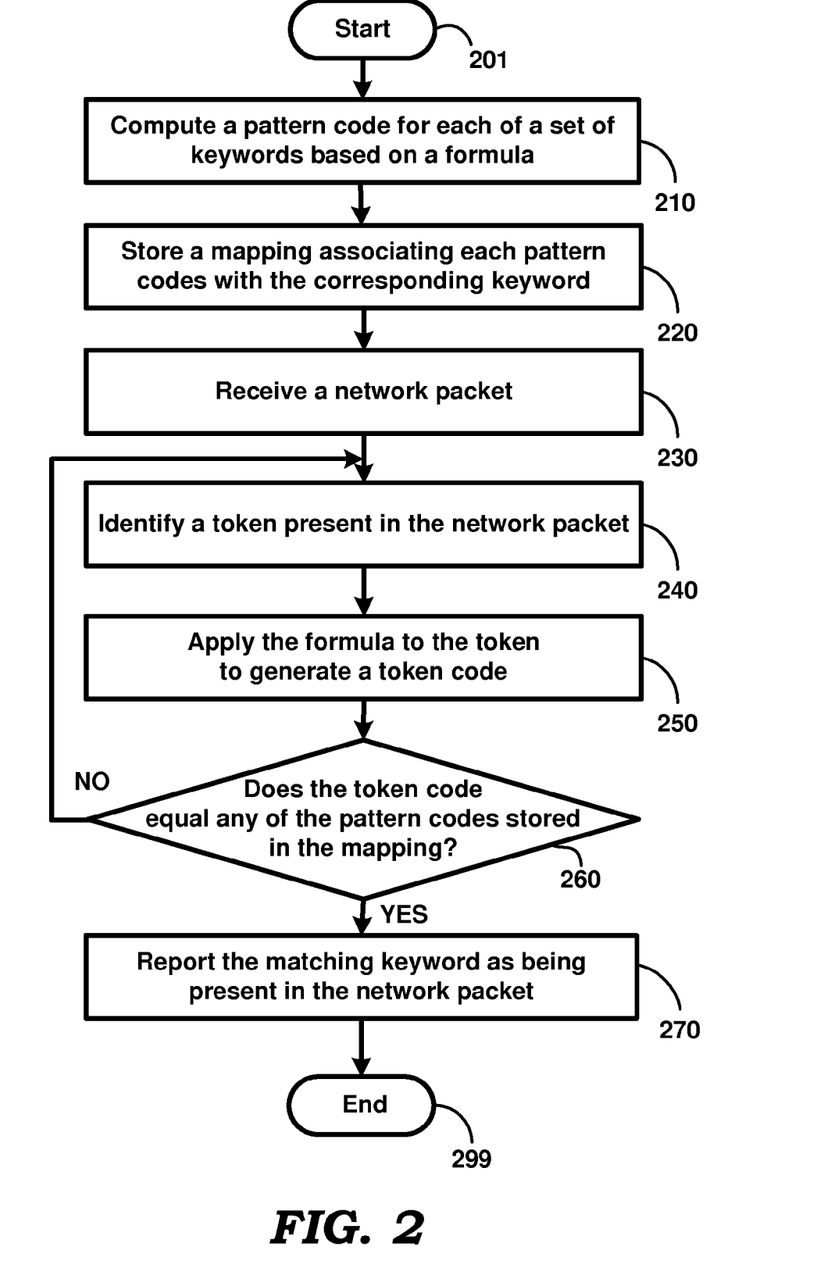
FIG. 2 is a flow chart illustrating the manner in which deep packet inspection of network packets for keywords of a vocabulary is performed according to an aspect of the present disclosure.

FIG. 2 is a flow chart illustrating the manner in which deep packet inspection of network packets for keywords of a vocabulary is performed according to an aspect of the present disclosure. The flowchart is described with respect to scheduler 150 of FIG. 1 merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, scheduler 150 computes a pattern code for each of a set of keywords (of a vocabulary) based on a formula. The formula ensures that a unique pattern code is computed for each keyword of the vocabulary, while also maintaining the length of the pattern code to be shorter than the length of the keywords. In one embodiment, the formula computes the pattern codes as corresponding numerical values. As is well known, such numerical values can be represented using a lesser number of bits as compared to representing the sequence of characters constituting the keywords.

In step 220, scheduler 150 stores a mapping associating each of the computed pattern codes with the corresponding keywords. The mapping may be maintained using any convenient data structure (such as a table in a database, associative array, etc.) and/or convenient format (such as XML) as suitable for the corresponding environment. The mapping may be maintained in non-volatile storage (such as a Flash Memory) internal to scheduler 150 or in one of data stores 160A-160D.

In step 230, scheduler 150 receives a network packet. The network packet may be one of a sequence of network packets forming a client request sent by one of client systems 110A-110X. As is well known, the network packet typically contains multiple headers (corresponding to different protocols such as IP, TCP, HTTP, etc.) along with a payload.

In step 240, scheduler 150 identifies a token present in the network packet. As described below, a token represents a sequence of one or more characters of the packet. The token may be identified after receiving all of the content (headers and payload) of the network packet, or alternatively as and when data portions (bytes/words) of the network packet are received by scheduler 150.

In step 250, scheduler 150 applies the formula (used in step 210) to the token to generate a token code. The token code, similar to the pattern code, is generated as a corresponding numerical value.

In step 260, scheduler 150 checks whether the token code equals any of the pattern codes in the mapping (maintained in step 220). In other words, a numerical comparison of the token code and the pattern codes is performed to determine a pattern code that is numerically equal to the token code. Control passes to step 270 if such a pattern code exists and to step 240 otherwise where the above steps are iteratively performed for subsequently identified tokens in the received network packet.

In step 270, the matching keyword (corresponding to the equaling pattern code) is reported (for further use) as being present in the network packet, and then control passes to step 299, where the flow chart ends. Though not shown, in alternative embodiments, the control may pass to step 240, wherein other matching keywords may possibly be identified and reported by operation of steps 240, 250, 260 and 270.

Thus, scheduler 150 performs deep packet inspection of network packets for keywords of a vocabulary. It may be appreciated that since only numerical comparisons are required to be performed for identifying matching keywords, the number of bits that are compared may be considerably less, for example, in contrast to the number of bits compared for performing direct string comparisons. Accordingly, the DPI of network packets for keywords may be enabled to be implemented even in environments with limited resources.

The manner in which scheduler 150 may perform DPI of network packets according to the flow chart of FIG. 2 is illustrated below with examples.

4. Illustrative Example

FIGS. 3 and 4A-4E together illustrates the manner in which deep packet inspection of network packets for keywords of a vocabulary is performed in one embodiment. Each of the drawings is described in detail below.

For illustration, it is assumed that the keywords of the HTTP vocabulary are sought to be identified in network packets. However, the features of the present disclosure may be implemented in the context of other vocabularies as specified by any MIME (Multipurpose Internet Mail Extensions) based protocol such as SMTP (Simple Mail Transfer Protocol), XMPP (Extensible Messaging and Presence Protocol), IMAP (Internet Message Access Protocol), etc. as well, as will be apparent to one skilled in the relevant arts by reading the disclosure herein.

Figure 3:
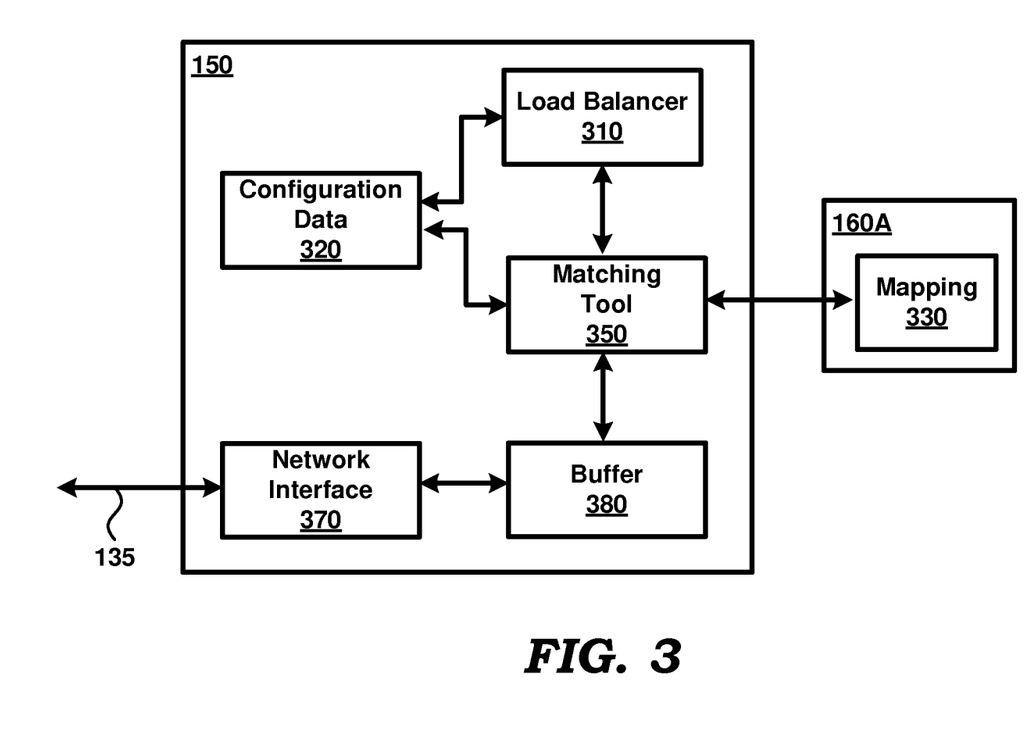
FIG. 3 is a block diagram illustrating the implementation of a scheduler provided according to several aspects of the present disclosure.

FIG. 3 is a block diagram illustrating the implementation of a scheduler (150) provided according to several aspects of the present disclosure. Scheduler 150 is shown containing load balancer 310, configuration data 320, mapping 330, matching tool 350, network interface 370 and buffer 380. Each of the blocks is described in detail below.

Load balancer 310 represents a management software program (executing in scheduler 150) which distributes the client requests received from client systems 110A-110X to the various instances of the enterprise applications executing in server systems 140A-140M. In general, load balancer 310 forwards requests to specific instances as specified by an administrator, while ensuring that the number of client requests handled by each application instance/server system is within a desirable range.

Configuration data 320 represents the data specified by an administrator of cluster 130 based on which load balancer 310 distributes the client requests. In particular, configuration data 320 specifies the processing operations to be performed in response to corresponding HTTP keywords and associated data values being present in the network packets. A sample configuration data that may be specified by an administrator is described below with respect to FIG. 4A.

Figure 4A:
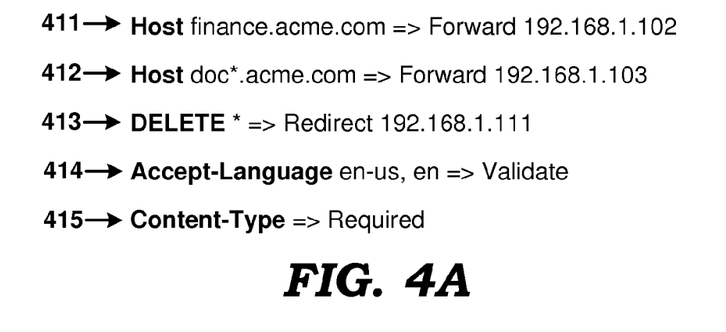
FIG. 4A depicts a portion of a configuration data used for forwarding network packets in one embodiment.

FIG. 4A depicts a portion of a configuration data (320) used for forwarding network packets in one embodiment. Each of lines 411-415 specifies a corresponding processing operations based on HTTP keywords (and also data values) contained in the network packets. Each line is of the format "[keyword] [regular expression]=>[processing operation] [server info]", wherein "keyword" is a keyword according to HTTP protocol (shown in bold) that is to be matched, "regular expression" is a regular expression for the data value corresponding to the matched keyword, "processing operation" indicates the specific operation to be performed on match of the keyword and regular expression, "server info" indicates the IP address of a specific server system used as part of the performance of the processing operation, and the square brackets in the format indicate that the corresponding portions are optional.

Thus, line 411 indicates that upon match/occurrence of the HTTP keyword "Host" and the value "finance.acme.com" in the data value corresponding to the keyword in (the deep packet portion of) a network packet, the network packet is to be forwarded to the server 192.168.1.102 (which may correspond to server system 140B). Similarly, other lines specify other processing operations to be performed by scheduler 150 in response to matching corresponding combination of keywords and data values in the HTTP header. It should be noted that the keyword "Content-Type" is typically specified in the network packets that are sent as part of the response from server systems 140A-140M to client system 110A-110X, with line 415 indicating that the keyword is required to be present in all such response network packets.

In response to the configuration data of FIG. 4A, scheduler 150 identifies the set of keywords ("Host", "DELETE", etc.) that are to be matched in network packets and then computes the pattern codes for each of the identified set of keywords based on a formula as described below with examples.

5. Computing Pattern Codes

According to an aspect of the present disclosure, the pattern code is a numerical value that is computed based on a positional formula. As is well known, a positional formula also considers the position (index location) of each character in addition to the value of the character. The different positions may be assigned different weights/multipliers such that different permutations of the same set of characters (e.g. "rat, "art", "tar") are computed to have different numerical values. In other words, the positional formula computes the numerical value based on the value of each character in a sequence of characters constituting the keyword and a corresponding weight assigned to the position of the character in the sequence of characters.

In one embodiment, each position is assigned a corresponding weight of $128^{position}$, wherein "^" is the exponential operator and the value of the position is 0 at the beginning of the sequence of characters. The weight assigned to each position is then multiplied by the ASCII value of each character (while being case sensitive) at that position to arrive at a sub-total for each character in the keyword. The sum of all the sub-totals is then calculated to be the pattern code of the keyword.

Thus, for a string having the sequence of characters c:0, c:1, c:2, . . . c:n−2, c:n−1, and c:n, where each c:x is a character at position x in the string, the pattern code can be computed as follows:

$$\text{Pattern code} = \text{ascii}(c{:}0)*128^{\wedge}0 + \text{ascii}(c{:}1)*128^{\wedge}1 + \text{ascii}(c{:}2)*128^{\wedge}2 + \ldots + \text{ascii}(c{:}n{-}2)*128^{\wedge}(n{-}2) + \text{ascii}(c{:}n{-}1)*128^{\wedge}(n{-}1) + \text{ascii}(c{:}n)*128^{\wedge}n$$

wherein ascii(x) is a function that returns the ASCII value of the character x; and "^" is the exponential operator.

It may be appreciated that the numerical values computed by the above equation may be very large for a larger (say, 10+) number of characters and accordingly may require a larger number of bits to represent the numerical values. According to another aspect of the present disclosure, the numerical value generated by the equation above is folded to ensure that the numerical values for all the keywords can be specified using a fixed number of bits (assumed to be 32 for illustration).

Accordingly, the weight assigned to each position is modified to $2^{\wedge}(7*n-32*v)$, where "n" is the position of the character (as counted from 0 from the beginning of the sequence) and "v" is a overflow value that is chosen such that the sub-total computed by multiplying the weight with the ASCII value of the character can be represented using the 32 (the fixed number of) bits. Furthermore, in the scenario that the numerical value calculated as the sum of the sub-totals is more than the fixed number of bits, the pattern code is computed by truncating (dropping the necessary most-significant bits) the numerical value to the fixed number of bits.

The manner in which a pattern code for the keyword "Accept-Language" (as shown in line 414) is described in detail below. Similar computations may be performed for other keywords as well, as will be readily understood by one skilled in the relevant arts by reading the disclosure herein.

Figure 4B:
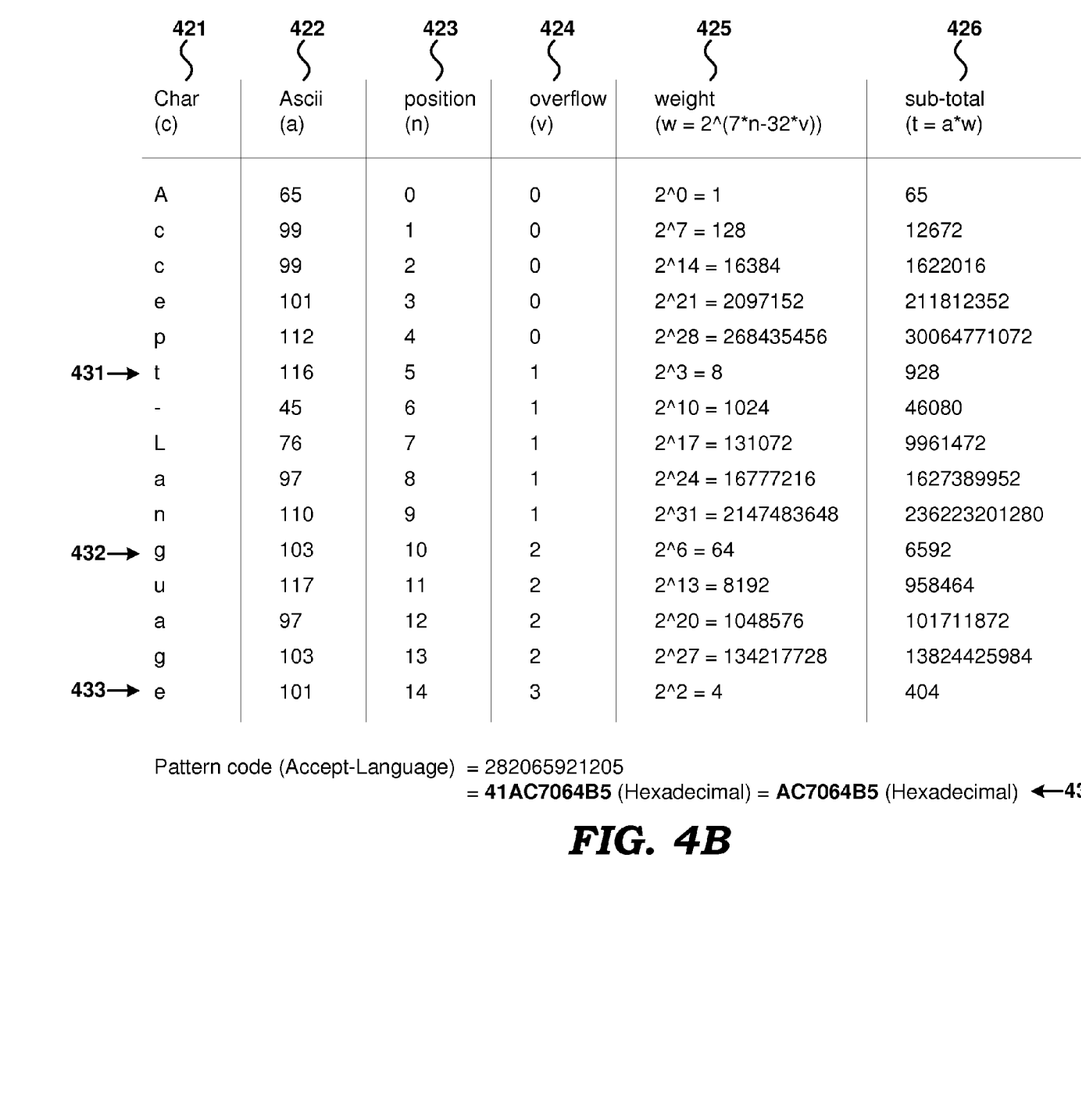
FIG. 4B illustrates the manner in which a pattern code for a keyword is computed based on a positional formula in one embodiment.

FIG. 4B illustrates the manner in which a pattern code for a keyword is computed based on a positional formula in one embodiment. Merely for ease of understanding, the computation is shown in a tabular format. The manner of implementation of the computation will however be apparent to one skilled in the relevant arts based on the tabular format.

Thus, for each specific character of the keyword shown in column 421, column 422 specifies the corresponding ASCII value, column 423 specifies the position of the character (as counted from 0 from the beginning of the sequence), column 424 specifies the value of the overflow chosen for the position, column 425 specifies the weight assigned to the position (as computed based on the position and the overflow), and column 426 specifies the sub-total computed (by multiplying the weight by the ASCII value) for the character.

It may be observed that in each of rows 431-433, the value of the overflow is changed to ensure that the weight (and accordingly the corresponding sub-total) is within the fixed number of bits. Furthermore, line 435 indicates the numerical value (in hexadecimal) computed as the sum of the sub-totals shown in column 426. It may be observed that the numerical value "41AC7064B5" computed has more than the fixed number of bits, and accordingly the value is truncated to generate the pattern code "AC7064B5" for the keyword "Accept-Language".

Thus, the pattern codes corresponding to different keywords of interest (as determined by inspecting the configuration data of FIG. 4A) are computed based on the positional formula. The manner in which the computed pattern codes may be maintained associated with respective keywords is described below with examples.

6. Maintaining Mapping Associating Pattern Codes and Keywords

Referring again to FIG. 3, matching tool 350 inspects configuration data 320 (in particular, the portions shown in FIG. 4A), identifies the set of HTTP keywords ("Host", "DELETE", etc.) that are to be matched in network packets and then computes the pattern codes for each of the identified set of keywords based on the positional formula. The pattern codes are computed similar to the computation shown in FIG. 4B. Matching tool 350 then stores each pattern code associated with the corresponding keyword in mapping 330. The manner in which mapping 330 may be implemented is described in detail below.

Figure 4C:
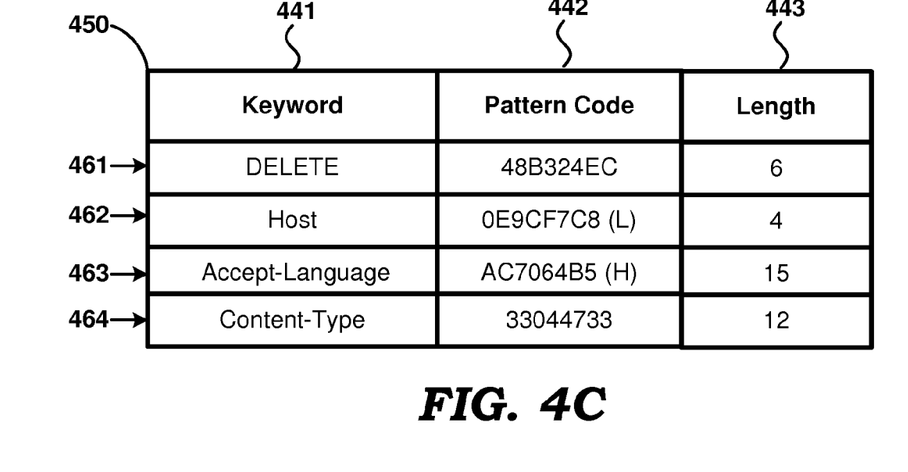
FIG. 4C depicts the manner in which a mapping associating corresponding pattern codes respective keywords is maintained in one embodiment.

FIG. 4C depicts the manner in which a mapping (330) associating corresponding pattern codes respective keywords is maintained in one embodiment. For illustration, it is assumed that data store 160A is implemented as a database server and that mapping 330 is maintained in the form of table 450 in a database in the database server. However, in alternative embodiments, the association of the pattern codes and keywords may be maintained using other data structures (such as trees, associative arrays, etc.) and/or in any other format such as XML (Extensible Markup Language), as will be apparent to one skilled in the relevant arts by reading the disclosure herein.

Table 450 is shown containing three columns with column 441 specifying the keyword sought to be matched, column 442 specifying the pattern code computed for the keyword and column 443 specify the length (number of characters) for the keyword. Each of rows 461-464 specifies the details of a corresponding association between a keyword and the corresponding computed pattern code. It may be observed that rows 461-464 includes all the keywords (such as DELETE, Host, etc.) that are specified as part of the configuration data of FIG. 4A. In particular, row 463 indicates that the pattern code of the keyword "Accept-Language" is "AC7064B5", as computed according to the calculations shown in FIG. 4B.

It may be noted that each character is generally represented by 8 bits (a byte), and accordingly each keyword is represented by (8*n) number of bits, wherein n is the number of characters in the keyword. In contrast, pattern code is shown as being stored using 32 bits (8 digits in hexadecimal).

It may also be appreciated that features of the present disclosure are advantageous when the pattern code is shorter in length than the corresponding keyword. Thus, the features may be applied when the frequency of usage of longer keywords of a vocabulary is substantially more than the frequency of usage of shorter keywords of the same vocabulary. An example of such a vocabulary is HTTP, the keywords of which are shown in Appendix A along with the corresponding computed pattern codes.

According to several aspects of the present disclosure, the lowest value and highest values of the pattern codes (in column 442) along with a list of lengths of the keywords (in column 441) are also maintained. In one embodiment, the lowest value of the pattern code is marked by the letter "L" (as shown row 462) and the highest value of the pattern code is marked by the letter "H" (as shown in row 463). Column 443 indicating the lengths of the keywords represents the list of lengths. However, in alternative embodiment, the list of lengths may be maintained independently (for example, without duplicate lengths), as will be apparent to one skilled in the relevant arts by reading the disclosure herein.

Thus, the association between the keywords of interest (for example, specified in configuration data) and the corresponding pattern codes, the lowest and highest values of the pattern codes and the list of lengths are maintained in table 450. The manner in which deep packet inspection (DPI) of network packets for keywords based on such maintained information is performed is described below with examples.

7. Deep Packet Inspection of Network Packets

Referring again to FIG. 3, network interface 370 receives one or more network packets (over path 135) from client systems 110A-110X, and stores the received packets in buffer 380. Buffer 380 represents a volatile storage, such as a portion of a Random Access Memory (RAM), that may be used to temporarily store the network packets (for example, prior to forwarding to server systems 140A-140M). A sample network packet that may be received and buffered is described in detail below.

Figure 4D:
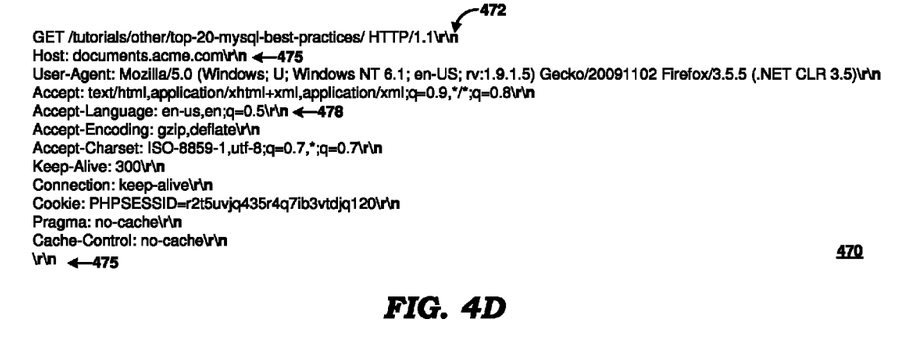
FIG. 4D depicts a portion of a network packet in one embodiment.

FIG. 4D depicts a portion of a network packet in one embodiment. In particular, data portion 470 depicts a portion of the HTTP header contained in the network packet. It may be observed that the HTTP header contains multiple lines demarcated by the new line character sequence "\r\n" (e.g., shown at 472), with the end of the header indicated by a blank line (as shown at 475). The first word (sequence of characters terminated by a whitespace or colon) in each line (such as 475 and 478) is expected to be a HTTP keyword, with the rest of the line being the data value associated with the HTTP keyword.

Referring again to FIG. 3, it may be appreciated that the HTTP header (of 470) is generally received as part of a single network packet. In other words, the size (X in bytes) of an HTTP header is generally less than the MSS (Maximum Segment Size) in bytes of the TCP connection established between a client system (110A-110X) and scheduler 150. However, in some scenarios, the HTTP header may be received split into multiple network packets by network interface 370 and thereafter be stored in buffer 380.

For example, a client system may send (using a browser executing in the client system) two client requests using the "HTTP Pipeline" mechanism such that the second client request is generated immediately after the first client request without waiting for the response for the first client request, as is well known in the relevant arts. Assuming that X<MSS<2*X, the sending of the two requests may result in scheduler 150 receiving two network packets, with the first network packet containing the HTTP header of the first client request and a portion (of the size MSS-X bytes) of the second client request, and thereafter a second network packet containing the remaining portions/bytes of the second client request.

According to an aspect of the present disclosure, in response to a network packet (such as 470) being stored in buffer 380, matching tool 350 forms successive tokens, with each successive token containing an additional character compared to a prior token. Matching tool 350 then checks whether each of the successive tokens equals one of the keywords maintained in mapping 330. However, in alternative embodiments, the techniques of the present disclosure may be performed after a portion (e.g. a line such as 478) of a network packet has been stored in buffer 380, as will be apparent to one skilled in the relevant arts by reading the disclosure herein.

The manner in which a network packet (in particular the HTTP header of 470) is inspected by matching tool 350 is described in detail below. For illustration, it is assumed that matching tool 350 is processing the characters received after the new line at 472.

Figure 4E:
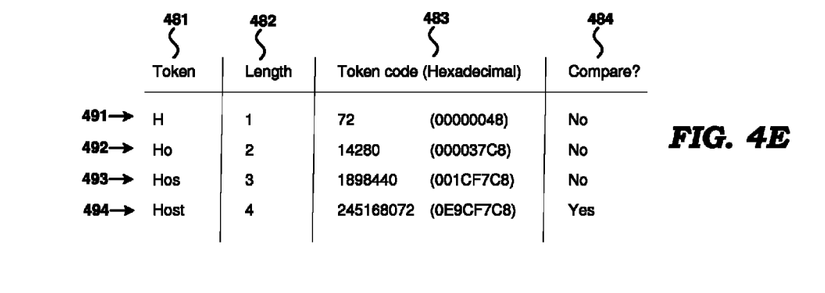
FIG. 4E illustrates the manner in which the characters contained in a network packet are formed into successive tokens and thereafter checked for keywords in one embodiment.

FIG. 4E illustrates the manner in which the characters contained in a network packet are formed into successive tokens and thereafter checked for keywords in one embodiment. Merely for ease of understanding, the formation of the tokens is shown in a tabular format. In particular, column 481 indicates the characters forming the corresponding token, column 482 indicates the number of characters in the token, column 483 indicates the token code generated corresponding to the token, and column 484 indicates whether a comparison (with the pattern codes in mapping 330) is to be performed (with a "Yes" value indicating comparison and a "No" value indicating otherwise).

Each of rows 491-494 indicates a corresponding successive token formed from the characters received after the new line at 472. It may be observed that each successive token (for example, "Hos" in row 493) is formed by appending the next character in the buffer ("s") to the previous token ("Ho") shown in the preceding row (492). The respective lengths of the tokens are accordingly shown as being incremented by 1 in column 482. The token codes in column 483 are computed by applying the positional formula (noted above) to the corresponding token.

For each of the successive tokens, mapping tool 350 determines whether the computed token code is between the lowest value and highest value of pattern codes in mapping 330 (in particular the values indicated as L and H in table 450) and also whether the length of the token (as indicated by column 482) is contained in the list of lengths shown in column 443 of FIG. 4C. If the token code is between the lowest and highest values and the length is contained in the list of lengths, matching tool 150 may indicate (in column 484) that the comparison of the token code with at least some of the pattern codes is to be performed (value "Yes" in row 494), and no comparisons are to be performed otherwise (value "No" in rows 491-493).

In the scenario that a comparison is to be performed (for example, for row 494), the token code "0E9CF7C8" generated for the keyword "Host" is compared to the pattern codes shown in column 442 of table 450. It should be noted that numerical comparisons are performed between the token code and the various pattern codes. Furthermore, in alternative embodiments, the number of comparisons may be reduced by employing techniques such as binary searches, as will be apparent to one skilled in the relevant arts by reading the disclosure herein.

Upon identifying that the token code "0E9CF7C8" equals a pattern code "0E9CF7C8" corresponding to a specific keyword "Host", matching tool 350 determines that the token matches the corresponding specific keyword "Host". In other words, matching tool 350 identifies that the keyword "Host" is present in the network packet (in particular, in the HTTP header portion 480). Matching tool 350 then reports the presence of the keyword "Host" to load balancer 310.

It should be noted that matching tool 350 may also perform matching of data values (such as "finance.acme.com", etc.) as specified in configuration data 320. Such matching is typically performed using regular expressions, as is well known in the relevant arts. For example, after determining that the keyword "Host" is specified in line 475 of HTTP header 470, matching tool 150 may identify the rest of line 475 ("documents.acme.com") as the data value specified for the keyword. Matching tool 350 thereafter performs a match with the regular expression specified in configuration data, and may accordingly identify that the processing operation of line 412 of FIG. 4A is to be performed. As such, matching tool 350 may forward the received network packet to the server 192.168.1.103 (which may correspond to server system 140C).

Thus, scheduler 150 provides deep packet inspection (DPI) of network packets for keywords of a vocabulary. Though described above with respect to network packets received from client systems 110A-110X, it may be appreciated that several features of the present disclosure may be provided when the network packets correspond to responses sent by server systems 140A-140M (for example, checking whether the keyword "Content-Type" is included in each response packet as indicated by line 415 of the configuration data of FIG. 4A).

It should be appreciated that the features described above can be implemented in various embodiments as a desired combination of one or more of hardware, executable modules, and firmware. The description is continued with respect to an embodiment in which various features are operative when executable modules are executed.

8. Digital Processing System

Figure 5:
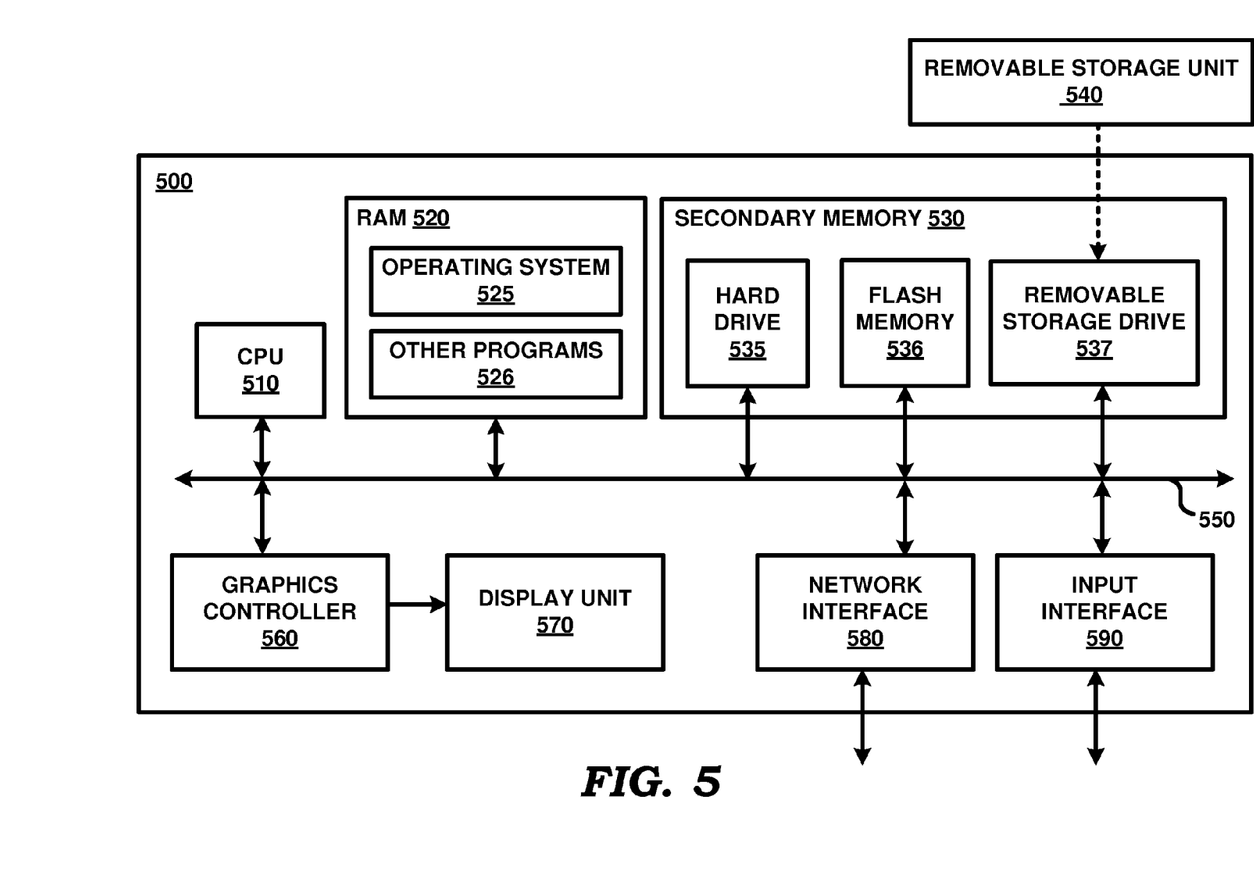
FIG. 5 is a block diagram illustrating the details of a digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 may correspond to scheduler 150 in FIG. 1.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550. RAM 520 is shown currently containing software instructions constituting operating environment 525 and/or other user programs 526. In addition to operating environment 525, RAM 520 may contain other software programs such as device drivers, virtual machines, etc., which provide a (common) run time environment for execution of other/user programs.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 provides connectivity to a network and may be used to communicate with other systems connected to the network (such as the nodes of FIG. 1).

Secondary memory 530 may contain hard drive 535, flash memory 536, and removable storage drive 537. Secondary memory 530 may store the data (for example, the portions of the data shown in FIGS. 4A-4E) and software instructions (for implementing the steps of FIG. 2, the computations shown in FIGS. 4B and 4E, and other features noted above), which enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

| Serial No. | HTTP Keyword | Pattern Code (in decimal) | Pattern Code (in hexadecimal) |
|---|---|---|---|
| 1 | Accept | 213448033 | 0cb8f561 |
| 2 | Accept-Language | 2893046965 | ac7064b5 |
| 3 | Accept-Datetime | 3705685045 | dce04435 |
| 4 | Authorization | 1711332497 | 6600dc91 |
| 5 | Cache-Control | 3536190123 | d2c5faab |
| 6 | Connection | 3450833627 | cdaf8adb |
| 7 | Cookie | 2642148075 | 9d7bfaeb |
| 8 | Content-Length | 1917093555 | 724486b3 |
| 9 | Content-MD5 | 2885130355 | abf79873 |
| 10 | Content-Type | 855918387 | 33044733 |
| 11 | Date | 213725380 | 0cbd30c4 |
| 12 | Expect | 1018970085 | 3cbc3fe5 |
| 13 | From | 230422854 | 0dbbf946 |
| 14 | Host | 245168072 | 0e9cf7c8 |
| 15 | If-Match | 444400361 | 1a7d02e9 |
| 16 | If-Modified-Since | 823434017 | 31149b21 |
| 17 | If-None-Match | 3451094969 | cdb387b9 |
| 18 | If-Range | 454496953 | 1b1712b9 |
| 19 | If-Unmodified-Since | 883998781 | 34b0c03d |
| 20 | Max-Forwards | 3351016773 | c7bc7545 |
| 21 | Pragma | 3707272280 | dcf87c58 |
| 22 | Proxy-Authorization | 2727298044 | a28f43fc |
| 23 | Range | 1559998674 | 5cfbb0d2 |
| 24 | Referer | 750484986 | 2cbb7dfa |
| 25 | TE | 8916 | 000022d4 |
| 26 | Upgrade | 509316981 | 1e5b8f75 |
| 27 | User-Agent | 1294276573 | 4d2517dd |
| 28 | Via | 1602774 | 001874d6 |
| 29 | Warning | 2648592455 | 9dde5047 |
| 30 | X-Requested-With | 1595062608 | 5f12b950 |
| 31 | DNT | 1386308 | 152744 |
| 32 | X-Forwarded-For | 2403129688 | 8f3cd958 |
| 33 | X-Forwarded-Proto | 2823602508 | a84cc14c |
| 34 | Front-End-Http | 3121062062 | ba07a0ae |
| 35 | X-ATT-DeviceId | 1710760192 | 65f82100 |
| 36 | X-Wap-Profile | 2188948096 | 8278b280 |
| 37 | Proxy-Connection | 1565023668 | 5d485db4 |
| 38 | Access-Control-Allow-Origin | 4024061887 | efda4fbf |
| 39 | Accept-Ranges | 1973052193 | 759a6321 |
| 40 | Age | 1668033 | 001973c1 |
| 41 | Allow | 2113615425 | 7dfb3641 |
| 42 | Cache-Control | 3536190123 | d2c5faab |
| 43 | Connection | 3450833627 | cdaf8adb |
| 44 | Content-Encoding | 4064695211 | f24653ab |
| 45 | Content-Language | 978670159 | 3a55524f |
| 46 | Content-Length | 1917093555 | 724486b3 |

APPENDIX A-continued

| Serial No. | HTTP Keyword | Pattern Code (in decimal) | Pattern Code (in hexadecimal) |
|---|---|---|---|
| 47 | Content-Location | 2051318191 | 7a44a1af |
| 48 | Content-MD5 | 2885130355 | abf79873 |
| 49 | Content-Disposition | 2044694935 | 79df9197 |
| 50 | Content-Range | 928286387 | 375486b3 |
| 51 | Content-Type | 855918387 | 33044733 |
| 52 | Date | 213725380 | 0cbd30c4 |
| 53 | ETag | 217606725 | 0cf86a45 |
| 54 | Expires | 759040877 | 2d3e0b6d |
| 55 | Last-Modified | 1320380788 | 4eb36974 |
| 56 | Link | 226211020 | 0d7bb4cc |
| 57 | Location | 1293334292 | 4d16b714 |
| 58 | P3P | 1317328 | 001419d0 |
| 59 | Pragma | 3707272280 | dcf87c58 |
| 60 | Proxy-Authenticate | 2521406340 | 96499b84 |
| 61 | Refresh | 1583044202 | 5e5b566a |
| 62 | Retry-After | 2469024954 | 932a54ba |
| 63 | ServerSet-Cookie | 2997272263 | b2a6bec7 |
| 64 | Strict-Transport-Security | 3225005443 | c039ad83 |
| 65 | Trailer | 3443147900 | cd3a447c |
| 66 | Transfer-Encoding | 321022376 | 132269a8 |
| 67 | Vary | 255635670 | 0f3cb0d6 |
| 68 | WWW-Authenticate | 2311440463 | 89c5c84f |
| 69 | X-Frame-Options | 3836374284 | e4aa6d0c |
| 70 | X-XSS-Protection | 4188581692 | f9a8af3c |
| 71 | X-Content-Security-Policy | 3043453638 | b5676ac6 |
| 72 | X-WebKit-CSP | 3668546032 | daa991f0 |
| 73 | X-Content-Type-Options | 2414686220 | 8fed300c |
| 74 | X-Powered-By | 1657737856 | 62cf1280 |
| 75 | X-UA-Compatible | 792613764 | 2f3e5384 |
| 76 | GET | 1385159 | 001522c7 |
| 77 | HEAD | 143680200 | 089062c8 |
| 78 | POST | 177530832 | 0a94e7d0 |
| 79 | PUT | 1387216 | 00152ad0 |
| 80 | DELETE | 1219699948 | 48b324ec |
| 81 | TRACE | 1483762004 | 58706954 |
| 82 | OPTIONS | 4181096127 | f93676bf |
| 83 | CONNECT | 1507129819 | 59d4f9db |
| 84 | PATCH | 2289377488 | 887520d0 |

What is claimed is:

1. A method of processing network packets, said method comprising:
maintaining a mapping specifying association of each of a plurality of keywords with a corresponding pattern code of a plurality of unique pattern codes, each pattern code being shorter in length compared to the corresponding keyword and being computed based on a formula;
receiving a network packet;
identifying a first token present in said network packet, said first token containing a first sequence of characters;
applying said formula to said first token to generate a first token code; and
determining that said first token matches a first keyword when said first token code equals a first pattern code corresponding to said first keyword in said mapping,
wherein each pattern code, including said first pattern code, and said first token code are computed as respective numerical values based on said formula, wherein a match is determined based on the numerical values of the first token code and the first pattern code being equal.

2. The method of claim 1, wherein said formula is a positional formula which computes a numerical value based on a value of each character in a sequence of characters and a corresponding weight assigned to the position of the character in said sequence of characters, wherein each keyword and each token is in the form of a corresponding sequence of characters,
wherein the pattern code of each keyword is computed as said numerical value by applying said positional formula to the sequence of characters constituting the keyword and the token code of each token is computed as said numerical value by applying said positional formula to the sequence of characters constituting the token.

3. The method of claim 2, wherein each character is represented by a first number of bits, wherein a first keyword of said plurality of keywords is represented by a corresponding number of bits equal to the product of the first number of bits and the number of characters in the corresponding sequence of characters constituting said first keyword,
wherein each of said plurality of pattern codes is represented by a second number of bits, wherein said second number of bits is less than the corresponding number of bits.

4. The method of claim 2, wherein said identifying, said applying and said determining together comprises:
forming successive tokens, with each successive token containing an additional character compared to a prior token; and
for each of said successive tokens, checking whether or not each successive token equals one of said plurality of keywords.

5. The method of claim 4, wherein said maintaining also maintains a lowest value and a highest value among said plurality of unique pattern codes, wherein said checking for each successive token comprises:
calculating a corresponding token code for the successive token; and
if the corresponding token code is between said lowest value and said highest value, comparing the corresponding token code as said first token code with at least some of said plurality of unique pattern codes of said mapping, and otherwise excluding the corresponding token code from said comparing.

6. The method of claim 5, wherein said maintaining also maintains a list of lengths of said plurality of keywords, wherein said checking for each successive token further comprises:
identifying whether the length of the successive token is contained in said list of lengths,
wherein said comparing is performed with the corresponding token code of the successive token as said first token code, in response to said length of the successive token being identified as being contained in said list of lengths.

7. The method of claim 2, wherein said positional formula is:

$$c = \sum_{x=0}^{n} ascii(C_x) * 128^x$$

wherein
$C_x$ represents the character at position x in a first sequence of characters,
n is equal to the number of characters in said first sequence of characters,
ascii(k) is a function that returns the ASCII value of the character k,
C is the corresponding pattern code when said first sequence of characters represents a keyword, and is the corresponding token code when said first sequence of characters represents a token.

8. The method of claim 7, wherein said plurality of keywords are specified according to a MIME (Multipurpose Internet Mail Extensions) based protocol.

9. A non-transitory machine readable medium storing one or more sequences of instructions for enabling a system to process network packets, wherein execution of said one or more instructions by one or more processors contained in said system causes said system to perform the actions of:
  maintaining a mapping specifying association of each of a plurality of keywords with a corresponding pattern code of a plurality of unique pattern codes, each pattern code being shorter in length compared to the corresponding keyword and being computed based on a formula;
  receiving a network packet;
  identifying a first token present in said network packet, said first token containing a first sequence of characters;
  applying said formula to said first token to generate a first token code; and
  determining that said first token matches a first keyword when said first token code equals a first pattern code corresponding to said first keyword in said mapping,
  wherein each pattern code, including said first pattern code, and said first token code are computed as respective numerical values based on said formula, wherein a match is determined based on the numerical values of the first token code and the first pattern code being equal.

10. The machine readable medium of claim 9, wherein said formula is a positional formula which computes a numerical value based on a value of each character in a sequence of characters and a corresponding weight assigned to the position of the character in said sequence of characters,
  wherein each keyword and each token is in the form of a corresponding sequence of characters,
  wherein the pattern code of each keyword is computed as said numerical value by applying said positional formula to the sequence of characters constituting the keyword and the token code of each token is computed as said numerical value by applying said positional formula to the sequence of characters constituting the token.

11. The machine readable medium of claim 10, wherein each character is represented by a first number of bits, wherein a first keyword of said plurality of keywords is represented by a corresponding number of bits equal to the product of the first number of bits and the number of characters in the corresponding sequence of characters constituting said first keyword,
  wherein each of said plurality of pattern codes is represented by a second number of bits, wherein said second number of bits is less than the corresponding number of bits.

12. The machine readable medium of claim 10, wherein said identifying, said applying and said determining together comprises one or more instructions for:
  forming successive tokens, with each successive token containing an additional character compared to a prior token; and
  for each of said successive tokens, checking whether or not each successive token equals one of said plurality of keywords.

13. The machine readable medium of claim 12, wherein said maintaining also maintains a lowest value and a highest value among said plurality of unique pattern codes, wherein said checking for each successive token comprises one or more instructions for:
  calculating a corresponding token code for the successive token; and
  if the corresponding token code is between said lowest value and said highest value, comparing the corresponding token code as said first token code with at least some of said plurality of unique pattern codes of said mapping, and otherwise excluding the corresponding token code from said comparing.

14. The machine readable medium of claim 13, wherein said maintaining also maintains a list of lengths of said plurality of keywords, wherein said checking for each successive token further comprises one or more instructions for:
  identifying whether the length of the successive token is contained in said list of lengths,
  wherein said comparing is performed with the corresponding token code of the successive token as said first token code, in response to said length of the successive token being identified as being contained in said list of lengths.

15. A digital processing system comprising:
  a processor;
  a random access memory (RAM);
  a machine readable medium to store one or more instructions, which when retrieved into said RAM and executed by said processor causes said digital processing system to process network packets, said digital processing system performing the actions of:
    maintaining a mapping specifying association of each of a plurality of keywords with a corresponding pattern code of a plurality of unique pattern codes, each pattern code being shorter in length compared to the corresponding keyword and being computed based on a formula;
    receiving a network packet;
    identifying a first token present in said network packet, said first token containing a first sequence of characters;
    applying said formula to said first token to generate a first token code; and
    determining that said first token matches a first keyword when said first token code equals a first pattern code corresponding to said first keyword in said mapping,
    wherein each pattern code, including said first pattern code, and said first token code are computed as respective numerical values based on said formula, wherein a match is determined based on the numerical values of the first token code and the first pattern code being equal.

16. The digital processing system of claim 15, wherein said formula is a positional formula which computes a numerical value based on a value of each character in a sequence of characters and a corresponding weight assigned to the position of the character in said sequence of characters,
  wherein each keyword and each token is in the form of a corresponding sequence of characters,
  wherein the pattern code of each keyword is computed as said numerical value by applying said positional formula to the sequence of characters constituting the keyword and the token code of each token is computed as said numerical value by applying said positional formula to the sequence of characters constituting the token.

17. The digital processing system of claim 16, wherein each character is represented by a first number of bits, wherein a first keyword of said plurality of keywords is represented by a corresponding number of bits equal to the product of the first number of bits and the number of characters in the corresponding sequence of characters constituting said first keyword,
wherein each of said plurality of pattern codes is represented by a second number of bits, wherein said second number of bits is less than the corresponding number of bits.

18. The digital processing system of claim 16, wherein for said identifying, said applying and said determining, said digital processing system performs the actions of:
forming successive tokens, with each successive token containing an additional character compared to a prior token; and
for each of said successive tokens, checking whether or not each successive token equals one of said plurality of keywords.

19. The digital processing system of claim 18, wherein said maintaining also maintains a lowest value and a highest value among said plurality of unique pattern codes, wherein for said checking for each successive token, said digital processing system performs the actions of:
calculating a corresponding token code for the successive token; and
if the corresponding token code is between said lowest value and said highest value, comparing the corresponding token code as said first token code with at least some of said plurality of unique pattern codes of said mapping, and otherwise excluding the corresponding token code from said comparing.

20. The digital processing system of claim 19, wherein said maintaining also maintains a list of lengths of said plurality of keywords, wherein for said checking for each successive token, said digital processing system performs the actions of:
identifying whether the length of the successive token is contained in said list of lengths,
wherein said comparing is performed with the corresponding token code of the successive token as said first token code, in response to said length of the successive token being identified as being contained in said list of lengths.

* * * * *